United States Patent [19]

Eoff et al.

[11] Patent Number: 5,339,903

[45] Date of Patent: Aug. 23, 1994

[54] METHOD FOR CONTROL OF GAS MIGRATION IN WELL CEMENTING

[75] Inventors: Larry S. Eoff; Bill W. Loughridge, both of Duncan, Okla.

[73] Assignee: Halliburton Company, Duncan, Okla.

[21] Appl. No.: 151,311

[22] Filed: Nov. 12, 1993

[51] Int. Cl.$^5$ .............................................. E21B 33/13
[52] U.S. Cl. ................................ 166/293; 106/725; 106/727; 106/808; 106/809; 523/130
[58] Field of Search ................. 166/293; 106/725, 727, 106/808, 809; 527/400; 523/130

[56] References Cited

U.S. PATENT DOCUMENTS

| | | | |
|---|---|---|---|
| Re. 29,595 | 3/1978 | Adams et al. | 166/293 X |
| 4,296,813 | 10/1981 | Detroit et al. | 166/293 |
| 4,579,927 | 4/1986 | Patel et al. | 527/400 |
| 4,676,317 | 6/1987 | Fry et al. | 166/293 |
| 4,703,801 | 11/1987 | Fry et al. | 166/293 |
| 5,028,271 | 7/1991 | Huddleston et al. | 106/727 X |
| 5,099,922 | 3/1992 | Ganguli | 166/293 |
| 5,134,215 | 7/1992 | Huddleston et al. | 527/400 |
| 5,147,964 | 9/1992 | Huddleston et al. | 527/400 |

OTHER PUBLICATIONS

"The Relationship of Thickening Time, Gel Strength, and Compressive Strength of Oilwell Cements". *SPE Production Engineering*, Mar. 1986, pp. 143–152.
*The Condensed Chemical Dictionary*, 7th Edition, 1969, pp. 917 and 1016.
*The Merck Index*, 9th Edition, 1981, pp. 1172 and 1173.

*Primary Examiner*—George A. Suchfield
*Attorney, Agent, or Firm*—Robert A. Kent; Thomas R. Weaver

[57] ABSTRACT

A method of cementing a wellbore which penetrates a subsurface gas-containing formation is provided whereby gas migration is reduced. The method features the use of an additive consisting of a tannin backbone having grafted thereto at least two different vinylamide derivatives. The additive causes the cement slurry employed in the method to exhibit a Zero Gel Time of greater than about one hour, a Transition Time of less than about one hour and controls fluid loss from the slurry.

5 Claims, No Drawings

METHOD FOR CONTROL OF GAS MIGRATION IN WELL CEMENTING

BACKGROUND OF THE INVENTION

1. Field of The Invention

This invention relates to well cementing. This invention further relates to cementing wells which penetrate subterranean formations which produce gas. This invention still further relates to a composition for and a method of cementing a well with a slurry of hydraulic cement in water whereby the movement of gas into the slurry from a subterranean formation adjacent thereto is substantially reduced if not eliminated.

2. Related Art and Problem Solved

In the art of cementing a wellbore penetrating a subterranean earth formation, it is well known that a sheath of hardened cement is formed in the annular space between the walls of the wellbore which penetrates the formation and a well pipe, such as a casing, wherein the purpose of the sheath is to support the casing in the wellbore and to prevent the undesirable movement of formation fluids, i.e., oil, gas and water, within the annular space between subsurface formations and/or to the surface of the earth. It is known that the process of forming the sheath is referred to as primary cementing.

According to the well known process of primary cementing, a slurry of hydraulic cement in water is formed, the slurry is then pumped down the casing and then circulated up from the bottom thereof in the annulus to a desired location and then permitted to set in the annulus where the hydraulic cement reacts with the water in the slurry to form the sheath of hardened cement.

The slurry of cement, when first placed in the annulus, acts as a true liquid and will, therefore, transmit hydrostatic pressure. Thus, sufficient hydrostatic pressure is exerted, as a feature of the process of primary cementing, to balance the pressure of any gas in the formation to thereby prevent the movement of gas from the formation into and through the slurry in the annulus. Movement of gas from a formation into and through a cement slurry in an annulus is referred to in the art as gas migration.

Gas migration is a problem in primary cementing which can lead to movement of gas in the slurry from one formation to another or even to the surface of the earth. Such movement can cause loss of control of pressure and lead to a blowout. As mentioned previously, gas migration can be controlled if sufficient pressure can be transmitted through the slurry. However, loss of control can be experienced and gas migration can occur if the slurry does not possess the properties of a true fluid and is unable to transmit hydrostatic pressure.

Before a slurry of hydraulic cement sets into a hardened mass having compressive strength, events take place which cause the slurry to lose the ability to transmit hydrostatic pressure. One of the events is the loss of fluid from the slurry to the formation. Another event is the development of static gel strength in the slurry.

It seems clear that the loss of water from a slurry of cement will diminish the ability of the slurry to transmit hydrostatic pressure. The ability to control water loss is more difficult as the temperature increases, especially at temperatures greater than about 200° F. It is thus an object of this invention to provide a composition for and a method of reducing fluid loss from a slurry of hydraulic cement at temperatures greater than about 200° F.

When a slurry of hydraulic cement becomes static it begins to develop a property known in the art as static gel strength, or simply gel strength. (In this regard, note Sabins, et al., "The Relationship of Thickening Time, Gel Strength, and Compressive Strength of Oilwell Cements," *SPE Production Engineering*, March 1986, pages 143–152.)

Gel strength is not compressive strength. Thus, as a slurry of hydraulic cement sets into a hardened mass having compressive strength, it is believed that the hardening process experiences phases which are relevant to the phenomenon of gas migration. In the first phase of the process, it is believed that the slurry contains sufficient liquid to enable the slurry to possess the characteristics of a true fluid. Accordingly, during the first phase, the slurry can transmit hydrostatic pressure and gas migration can be prevented by applying sufficient hydrostatic pressure which is transmitted against a gas-containing formation to thereby prevent the movement of gas from the formation into the slurry.

During the first phase of the process, some of the liquid in the slurry is lost—this is referred to as fluid loss—and the slurry begins to stiffen due to the formation of a gel structure. During this period of fluid loss and gel formation it is believed that the setting cement retains the ability to transmit hydrostatic pressure. Accordingly, gas migration can be prevented so long as the slurry exhibits the properties of a true fluid and so long as the stiffness of the gel structure—referred to as gel strength—is less than or equal to a certain value, which, for purposes of this invention, is referred to as the first critical value. The first critical value is believed to be about 100 $lb_f$/100 sq. ft.

In the second phase of the hardening process, the gel strength of the slurry exceeds the first critical value and continues to increase; fluid loss may continue, although at a rate much lower than that experienced in the first phase. During this period, it is believed that the setting cement loses the ability to transmit full hydrostatic pressure. Accordingly, gas migration may not be prevented during the second phase because the gel strength of the slurry may be too high to permit full transmission of hydrostatic pressure, but too low to resist pressure exerted by gas in the formation against the slurry. This condition exists until the gel strength increases to a value, which for purposes of this invention, is referred to as the second critical value, which is high enough to resist pressure exerted by gas in the formation against the slurry. The second critical value is believed to be about 500 $lb_f$/100 sq. ft.

In the third phase of the hardening process, gas migration is prevented because gel strength is equal to or greater than the second critical value. The cement continues to harden until it attains a compressive strength deemed sufficient to enable further operations in the wellbore.

It is noted that Sabins, et al., mentioned above, provide a discussion and a description of a method and apparatus to experimentally determine gel strength value.

In view of the above, in order to minimize gas migration, it is desirable that maximum fluid loss, if any, should occur prior to the beginning of the second phase of the cement hardening process; that the first phase should continue over an extended period of time; and that the second phase should be completed in a short period of time.

The time required for a slurry of hydraulic cement to attain the first critical value from the time the slurry becomes static is defined herein as "Zero Gel Time," and the time required for a slurry to attain the second critical value from the time it attains the first critical value is defined herein as "Transition Time."

It is thus another object of this invention to provide a composition for and a method of extending Zero Gel Time of a slurry for a time sufficient to enable the rate of fluid loss from the slurry to decline to a substantially constant value and to accelerate Transition Time.

It is a further object of this invention to provide a method of cementing a borehole which penetrates a gas-containing subterranean formation whereby gas migration at temperatures up to 400° F. and particularly above 200° F. is reduced if not eliminated.

SUMMARY OF THE INVENTION

It has now been discovered that a compound consisting of a tannin backbone having polymers grafted thereto, when added to a slurry of hydraulic cement in water, can reduce fluid loss from and modify the gel strength of the slurry at temperatures up to about 400° F. and particularly in the range of from about 200° F. to about 400° F. The fluid loss control and gel strength modification properties of the compound render the compound very useful in a method of cementing a borehole which penetrates a subterranean gas-containing formation whereby migration of gas from the formation into and through the slurry in the borehole is reduced.

The polymer grafted tannin cement additive of this invention consists of a tannin backbone portion having grafted thereto a graft portion consisting of pendent polymer groups. The pendent polymer groups are vinylamide derivatives selected from compounds represented by the general formula

   (1)

wherein $R_1$ is hydrogen (—H) or a methyl group (—$CH_3$), $R_2$ is hydrogen (—H) or a methyl group (—$CH_3$) and $R_3$ is hydrogen (—H), a methyl group (—$CH_3$) or a propanesulfonic acid group

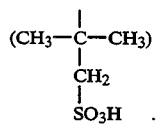

The additive of this invention contains at least two and preferably three, different vinylamide derivatives. One of the two pendent polymers required herein must be a vinylamide derivative having the mentioned propanesulfonic acid group, i.e., $R_3$ in formula (1) is a propanesulfonic acid group. (For convenience, this derivative is referred to as the first vinylamide derivative.) Another one of the two pendent polymers required herein must be a vinylamide derivative having two methyl groups attached to nitrogen, i.e., $R_2$ and $R_3$ in formula (1) are methyl groups. (For convenience, this derivative is referred to as the second vinylamide derivative.)

Tannin, the backbone portion of the additive of this invention, broadly refers to any of various soluble astringent complex phenolic substances extracted from plants. Tannin, also called tannic acid, naturally occurs in the bark, fruit and heartwood of many plants for example in the bark of the oak species, in sumac, myrobalan, nutgall, hemlock, quebracho, wattle, mimosa, mangrove, chestnut, gambier, acacia and cutch.

The chemistry of tannin is complex, is not uniform, and is beyond the scope of this invention, but, in general, tannin may be divided into two groups: (a) derivatives of flavanols, so-called condensed tannins, and (b) hydrolyzable tannins.

Flavanoid tannins are preferred for use as the backbone portion of the additive of this invention.

Flavanoid tannins are recognized as falling into either of two broad structural series: the resorcinol-catechol series and the resorcinol-pyrogallol series. Inasmuch as they often occur together in nature, members from either one or both of the flavanoid series, or oligomeric combinations thereof, are contemplated as broadly suitable for the practice of this invention. Common sources of flavanoid tannins include extracts of quebracho, wattle, mimosa, mangrove, chestnut, gambier and cutch.

Tannins preferred for use herein are extracted from wattle bark found in the Australian wattle and South African acacia. Further discussion of tannin is available in: *The Condensed Chemical Dictionary*, 7th Edition, 1969, at pages 917 and 1016; *The Merck Index*, 9th Edition, 1981, at pages 1172 and 1173; Patel, et al., U.S. Pat. No. 4,579,927; Huddleston, et al., U.S. Pat. No. 5,147,964; and Huddleston, et al., U.S. Pat. No. 5,134,215.

Grafting polymers on a natural product backbone is a wellknown process. An example of the process is found in Fry, et al., U.S. Pat. No. 4,703,801 and Fry, et al., U.S. Pat. No. 4,676,317 each of which disclose a natural product backbone lignin or lignite, having grafted thereto polymers including homopolymers and copolymers of 2-acrylamido-2-methylpropanesulfonic acid and N,N-dimethylacrylamide. The Fry, et al., polymer graft is disclosed to be useful in a cementing composition as a fluid loss additive. Fry, et al., do not mention modification of slurry gel properties, zero gel time, transition time or gas migration at any temperature much less at temperatures up to 400° F.

Another example of the use of a polymer grafted natural product backbone in a well cementing composition is provided in Huddleston, et al., U.S. Pat. No. 5,134,215 and Huddleston, et al., U.S. Pat. No. 5,147,964. Huddleston, et al., each disclose a wattle tannin backbone grafted with 2-acrylamido-2-methylpropanesulfonic acid or with 2-acrylamido-2-methylpropanesulfonic acid and acrylamide. Huddleston, et al., disclose their polymer grafted tannin to be useful as a fluid loss additive in a cementing composition, but they do not mention modification of slurry gel properties, zero gel time, transition time or gas migration at any temperature much less at temperatures up to 400° F.

DESCRIPTION OF THE PREFERRED EMBODIMENTS

By this invention, there is provided a hydraulic cement slurry composition and method for cementing a pipe, such as a casing, in a wellbore whereby gas migration in the cement slurry is eliminated or at least substantially reduced at temperatures up to about 400° F. and particularly at temperatures in the range of from about 200° F. to about 400° F. Accordingly, when a pipe is cemented in a wellbore which penetrates a gas-containing subterranean formation, the composition of this invention, when placed by conventional steps adjacent the gas-containing formation, acts to eliminate, or to at least substantially reduce, gas migration, i.e., the movement of gas from the formation into and through the cement slurry.

As mentioned, gas migration is a problem to be avoided because it leads to communication by way of the well annulus between formations and/or to the surface and is thus a source of surface and subsurface blowouts.

Gas moving in a hardening cement slurry can create permanent channels in the set cement. The gas channels must be filled with cement in a separate remedial cementing technique called squeezing in order to prevent the communication mentioned above.

Gas migration is caused by the inability of the cement slurry placed in the zone adjacent the gas-containing formation to resist the pressure of the gas in the formation, accordingly, the gas moves from the formation into and through the slurry.

The hydraulic cement slurry composition of this invention is formulated to provide a Zero Gel Time of greater than about one hour and a Transition Time of less than about one hour to thereby maximize the time in which the hardening cement slurry can transmit hydrostatic pressure and thus prevent gas migration, and minimize the time in which gas migration can occur. Furthermore, fluid loss from the hydraulic cement slurry composition of this invention is less than about 100 cc/30 minutes and maximum fluid loss is believed to occur prior to the attainment of Zero Gel Time.

Cement slurries, which do not contain gel strength modifiers, such as those claimed herein, have Zero Gel Times much less than one hour. This means that the fluid loss rate from such a slurry will still be relatively high after the slurry has reached the second critical value. This high fluid loss rate combined with the inability of the gelled slurry to transmit hydrostatic pressure greatly increases the probability that gas migration will occur.

The hydraulic cement slurry composition of this invention is comprised of hydraulic cement, water present in an amount in the range of from about 35 percent to about 60 percent by weight of dry cement, and the gel strength modifier/fluid loss additive of this invention present in an amount in the range of from about 0.5 percent to about 2.0 percent by weight of dry cement. The slurry, in addition to the above ingredients, also preferably includes a high temperature set retarder such as sodium or calcium lignosulfonate or organic acids, such as tartaric or gluconic acid, or mixtures of such acids and lignosulfonates present in an amount in the range of from about 0.5 to about 2.0 percent by weight of dry cement, a high temperature strength regression aid, such as silicon dioxide, present in an amount in the range of from about 0 to about 40 percent by weight of dry cement and a high temperature solids suspending aid, such as boron treated guar or colloidal silica, present in an amount in the range of from about 0.2 percent to about 1.5 percent by weight of dry cement. If desired a weighting agent, such as hematite, may be included in the slurry in an amount in the range of from about 10 percent to about 60 percent by weight of dry cement.

The gel strength modifier/fluid loss additive of this invention is a compound consisting of a tannin backbone, preferably a wattle tannin backbone, having polymers grafted thereto as described in connection with formula (1) above.

The additive contains in the range of from about 2 to about 20 and preferably about 3 percent tannin by weight of additive and from about 80 to about 98 and preferably about 97 percent grafted polymers by weight of additive.

The graft portion of the additive, as previously stated, consists of at least two different and preferably three different polymerized vinylamide derivatives within the scope of formula (1). One of the vinylamide derivatives, herein referred to as the first derivative, must contain a propanesulfonic acid group and one of the vinylamide derivatives, herein referred to as the second derivative, must include methyl groups attached to the nitrogen atom as shown in formula (1). The additive may also include a third derivative different from both the first derivative and the second derivative.

The concentration of the vinylamide derivatives in the additive of this invention is expressed in terms of mole percent of each derivative in the graft portion of the additive. Accordingly, the first derivative is present in the graft portion in an amount in the range of from about 40 to about 90 and preferably about 70 mole percent of the graft portion; the second derivative is present in the graft portion in an amount in the range of from about 10 to about 40, and preferably about 20 mole percent of the graft portion; and the third derivative is present in the graft portion in an amount in the range of from about 0 to about 20 and preferably about 10 mole percent of the graft portion.

The preferred first derivative is 2-acrylamido-2methylpropanesulfonic acid. The preferred second derivative is N,N-dimethylacrylamide. The preferred third derivative is acrylamide.

Other specific compounds within the scope of formula (1) believed to be useful herein include methacrylamide, N,N-dimethylmethacrylamide and N-methylacrylamide.

The term "cement" as used herein is intended to include those compounds of a cementitious nature which are described as hydraulic cements. Such compounds include, for example, Portland Cement in general and particularly Portland Cements of API Classes G and H, although other API classes can be utilized, pozzolan cements, gypsum cements, high alumina content cements, high gel (high clay content) cements, silicate containing cements and high alkalinity cements can be used in various applications of the present invention. Portland cements and particularly cement of API Classes G and H are preferred.

The aqueous fluid utilized in the cement composition can be water from any source provided that it does not contain an excess of any compounds that affect the stability of the cement composition of the present invention. The aqueous fluid can contain various salts such as sodium chloride, potassium chloride, calcium chloride and the like.

Other types of well known and conventional additives also can be incorporated into the cement composition to modify the properties of the composition. Such additives include additional fluid loss additives or viscosifiers, retarders, accelerators, dispersants, weight-adjusting materials or fillers and the like.

Additional fluid-loss additives which may be incorporated into the cement composition of the present invention include cellulose derivatives such as carboxymethylhydroxyethyl cellulose, hydroxyethyl cellulose, modified polysaccharides, polyacrylamides, polyaromatic sulfonates, guar gum derivatives, mixtures of such compounds and the like. Numerous other compounds which may be utilized as additional fluid loss additives are well known by those skilled in cementing technology.

A retarder may be used in the cementing composition when the bottom hole circulating temperature exceeds 100° F. Examples of retarders which can be used herein include lignosulfonates, such as calcium lignosulfonate and sodium lignosulfonate, organic acids, such as tartaric acid and gluconic acid, and mixtures thereof. The amount of retarder required will vary according to the bottom hole circulating temperatures and variation in the makeup of the cement itself. The proper amount of retarder required in any particular case should be determined by running a "thickening time" test for the particular concentration of retarder and cement composition being used. Such tests should be run according to the procedures set by API SPEC 10. Generally speaking, "thickening time" is defined in API SPEC 10 as the elapsed time from the time pumping begins until the cement reaches from about 70 to 100 units of consistency. In most applications the amount of retarder, if any required, will not exceed more than about 5.0 percent by weight of the dry cement.

Dispersing agents can be utilized to facilitate using lower quantities of water and to promote higher set cement strength. Friction reducers which promote freer movement of the unset composition, and allow ease of pumping through the annulus, if present, can be incorporated in the slurry in amounts up to about several percent by weight of dry cement. Some dual function additives, such as lignosulfonates which function both as a dispersant and also as a set time retarder, can be incorporated in the slurry where their use would be advantageous for certain cementing situation.

Accelerators, such as the soluble inorganic salts in addition to calcium chloride, can be utilized up to about 8 percent by weight of cement.

The cement composition also may include in particular applications, foaming agents or defoaming agents which comprise various anionic, cationic, nonionic and other surface active compounds. The amount of such surface active agents added to the cement composition will typically be in the range of from about 0.1 to about 3 percent by weight of dry cement. Generally, the selection of such additives will be within the skill of those knowledgeable in cement technology.

Of the various types of fine aggregate which can be used, fly ash, silica flour, fine sand, diatomacious earth, lightweight aggregate and hollow spheres can be cited as typical. The use of these materials is well understood in the art, and so long as they are compatible with the compositions of the invention, they can be employed over wide ranges of concentration.

The following examples are provided to illustrate the unique benefits of the method of the present invention and not by way of limitation thereof.

EXAMPLE 1

A polymer grafted tannin of this invention may be prepared as follows:

| | |
|---|---|
| tannin | 11.7 grams |
| water | 435 grams |
| 50% NaOH | 1.3 grams |
| sodium AMPS (58%) | 517.2 grams |
| Acrylamide | 15.3 grams |
| N,N-dimethylacrylamide | 63.8 grams |
| water | 240.0 grams |
| sodium persulfate (25%) | 100.0 grams |
| sodium bisulfite | 3.8 grams |

435 grams water, 11.7 grams tannin, and 1.3 grams 50% NaOH were added to a 2 liter reaction vessel. The flask was equipped with a nitrogen sparge tube, mechanical stirrer, addition funnel, chemical feed pump, condenser, and thermocouple. The solution was sparged with nitrogen, stirred, and heated to 70° C. A solution of 517.2 grams 58% sodium AMPS, 15.3 grams acrylamide, 63.8 grams N,N-dimethylacrylamide, and 240.0 grams water was pumped steadily into the flask over a two hour period. Approximately 4.2 grams of 25% sodium persulfate solution was added every 10 minutes, starting 10 minutes after the monomer solution feed was begun. After the addition of all the sodium persulfate, the polymer was reacted 2–3 hours longer and 3.8 grams sodium bisulfite was added. The vessel was then cooled and the polymer was ready for use. The polymer of the example contains, on a molar basis, 60% AMPS, 10% acrylamide, 30% N,N-dimethylacrylamide, and 3% tannin on a weight basis.

Note: sodium AMPS is the sodium salt of 2-acrylamido-2-methylpropane sulfonic acid.

It is to be further noted that the method of preparation of the additive of this invention, as shown in Example 1, produces a random arrangement of polymers grafted to the tannin backbone. The preparation described in Example 1 is referred to as graft polymerization.

EXAMPLE 2

A polymer, made according to the procedure of Example 1, above, was prepared. It contained, on a molar basis, 70% AMPS, 10% acrylamide, 20% N,N-dimethylacrylamide, and 3% tannin by weight. This polymer was tested for fluid loss control and static gel strength modification in the compositions shown in Table 1 below. The amounts of all additives are shown in Table 1 based on the weight of dry cement.

TABLE 1

| Run | % Additive | Cement | % Water | % Sand | % Retarder[2] | % Suspending Aid[3] | Temperature (°F.) | Fluid Loss (cc/30 min) | Gel Times Zero | Gel Times Transition |
|---|---|---|---|---|---|---|---|---|---|---|
| 1 | 0.8 | Class H | 33 | — | 0.5 | — | 250 | — | 2:28 | 0:36 |
| 2 | 1.0 | Class H | 54 | 35 | 1.6 | 0.4 | 300 | 50 | 5:45 | 1:00 |
| 3 | 1.2 | Class G | 52 | 35 | 1.6 | 0.6 | 325 | — | 5:33 | 0:58 |
| 4 | 1.2 | Class G | 56.5 | 35 | 2.5 | 0.8 | 350 | 68 | 1:43 | 1:14 |
| 5 | 1.0[1] | Class H | 46 | 35 | 1.6 | 0.4 | 300 | — | 0:32 | 3:38+ |

TABLE 1-continued

| Run | % Additive | Cement | % Water | % Sand | % Retarder[2] | % Suspending Aid[3] | Temperature (°F.) | Fluid Loss (cc/30 min) | Gel Times Zero | Transition |
|---|---|---|---|---|---|---|---|---|---|---|
| 6 | None | Class G | 45 | — | 0.25[4] | — | 200 | — | 0:05 | 0:52 |

[1]90% Amps, 10% acrylamide, by mole of graft
[2]3% tannin by weight of additive (this additive is not within the scope of this invention and is provided for comparison purposes only)
[2]retarder is lignosulfonate/tartaric acid or lignosulfonate/gluconic acid
[3]suspending aid is colloidal silica
[4]sodium lignosulfonate Runs 1–4 in Table 1 produced a Zero Gel Time of more than 1 hour and a Transition Time of about 1 hour or less. Run 5 illustrates the results obtained by an additive which is not within the scope of this invention. Run 6 illustrates the result obtained when no additive is included in a slurry to modify gel strength.

EXAMPLE 3

Polymers made according to the procedure described in Example 1, above, were prepared containing the molar percentages of monomers as shown in Table 2. These products were tested for fluid loss control and static gel strength modification. The results are shown in Table 3, below.

TABLE 2

| Sample | Weight % Tannin | Weight % MBA[1] | Mole % AcAm[2] | Mole % DMAM[3] | Mole % AMPS[4] |
|---|---|---|---|---|---|
| 58 | 3.0 | 0.32 | 20 | 0 | 80 |
| 68 | 3.0 | 0 | 0 | 20 | 80 |
| 36 | 3.0 | 0 | 10 | 20 | 80 |

[1]MBA = methylene bis acrylamide
[2]AcAm = acrylamide
[3]DMAM = N,N-dimethylacrylamide
[4]AMPS = 2-acrylamido-2-methypropanesulfonic acid

TABLE 3

The compositions tested consisted of API Class H Portland Cement (1600 grams), 33% water by weight of cement and the quantities of polymer grafted tannins, retarders and quartz identified below.

| Sample[1] | Retarder Type | Retarder %[6] | Test Temp °F. | Fluid Loss cc/30 min | Zero Gel Time[4] | Transition Time[4] |
|---|---|---|---|---|---|---|
| 68 | A[2] | 0.4 | 250 | — | 2:38 | 0:20 |
| 68 | A[2] | 0.6 | 250 | 15 | — | — |
| 68 | A[2] | 1.5 | 300 | 6 | — | — |
| 58 | A[2] | 0.6 | 250 | 18 | — | — |
| 36 | A[2] | 1.0 | 275 | — | 2:08 | 1:07 |
| 36 | B[3] | 2.7 | 300 | — | 5:12 | 0:53 |
| 36 | B[3] | 1.8 | 300 | 26[5] | 3:15 | 1:32 |

Notes:
[1]Quantity of polymer grafted tannin employed was 1% by weight of cement.
[2]Retarder A is lignosulfonate/tartaric acid.
[3]Retarder B is lignosulfonate/gluconic acid.
[4]Time is expressed in hours and minutes (HR:MIN).
[5]Composition tested also included 35% 100 mesh quartz by weight of cement.
[6]Quantity of retarder employed is expressed in percent by weight of cement.

What is claimed is:

1. A method of cementing a borehole which penetrates a subterranean gas-containing formation whereby migration of gas from said formation into said borehole is reduced, said method being comprised of the steps of:
   forming a slurry of hydraulic cement in water;
   placing said slurry in said borehole adjacent said formation;
   permitting said slurry to set in said borehole whereby a hardened mass of cement is produced;
   wherein said slurry is comprised of water, hydraulic cement and an additive consisting of a tannin backbone portion having grafted thereto a graft portion consisting of at least a first vinylamide derivative and a second vinylamide derivative selected from compounds represented by the general formula

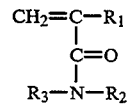

wherein $R_1$ is —H or —CH$_3$, $R_2$ is —H or —CH$_3$, and $R_3$ is —H, —CH$_3$ or

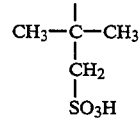

said first and said second vinylamide derivatives are different wherein $R_3$ in said first derivative is

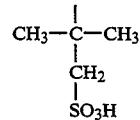

and $R_2$ and $R_3$ in said second derivatives are both —CH$_3$.

2. The method of claim 1 wherein the temperature of said formation is in the range of from about 200° F. to about 400° F.

3. The method of claim 2 wherein said additive is present in said cement composition in an amount in the range of from about 0.5 to about 2.0 percent by weight of hydraulic cement in said composition.

4. The method of claim 3 wherein said graft portion of said additive further consists of a third vinylamide derivative which is different from said first and said second vinylamide derivatives.

5. The method of claim 4 wherein said first derivative is 2-acrylamido-2-methylpropanesulfonic acid present in said graft portion in a concentration of 70 mole percent, said second derivative is N,N-dimethylacrylamide present in said graft portion in a concentration of 20 mole percent and said third derivative is acrylamide present in said graft portion in a concentration of 10 mole percent.

* * * * *